(No Model.)
W. H. HENDRICK.
SHUTTER WORKER.
No. 385,459. Patented July 3, 1888.
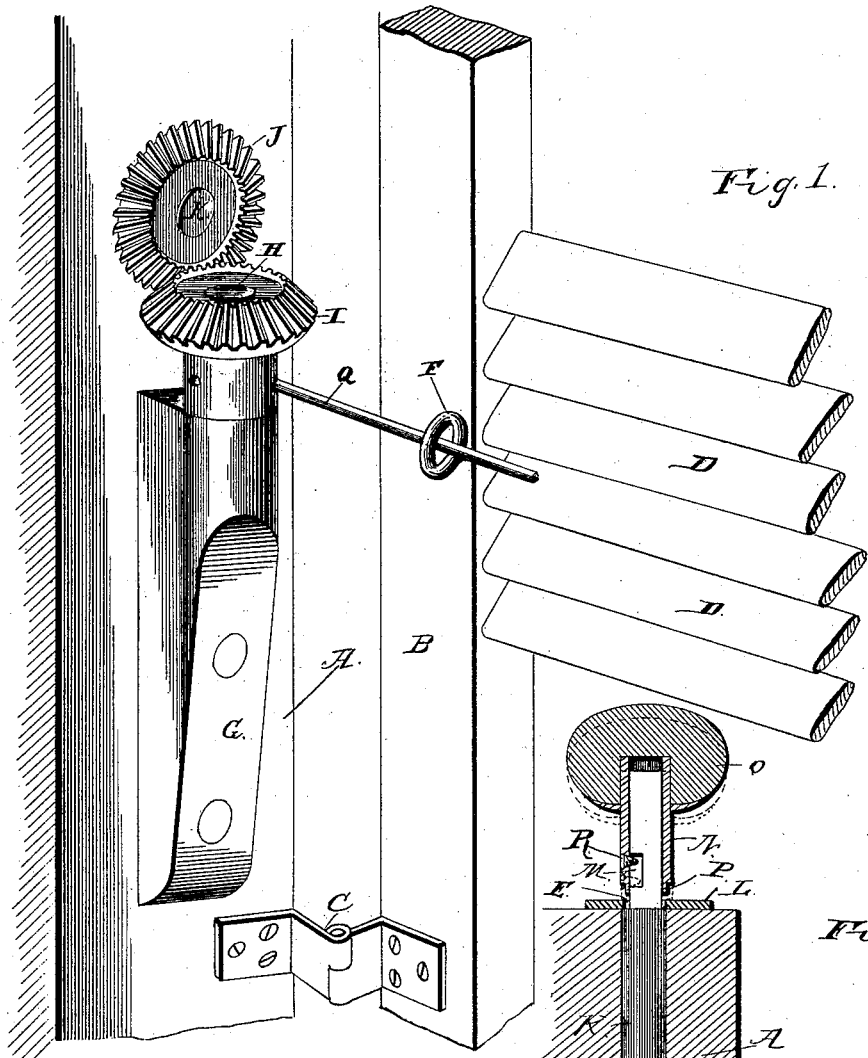
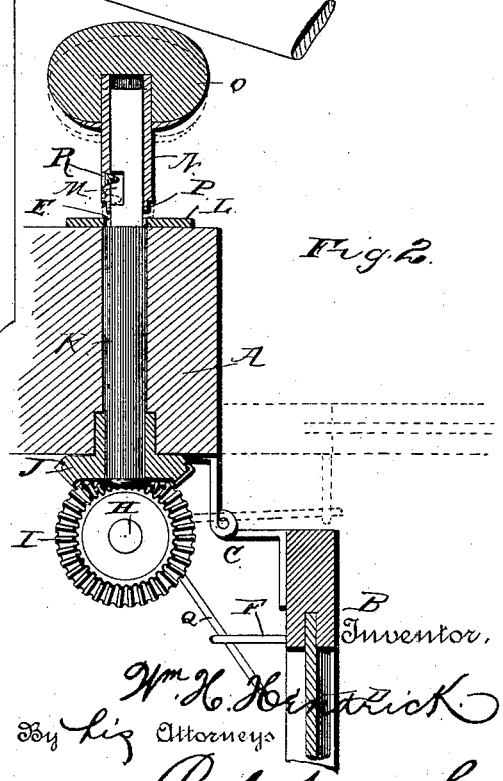

UNITED STATES PATENT OFFICE.

WILLIAM HARRIS HENDRICK, OF OTTAWA, KANSAS.

SHUTTER-WORKER.

SPECIFICATION forming part of Letters Patent No. 385,459, dated July 3, 1888.

Application filed October 11, 1887. Serial No. 252,056. (No model.)

*To all whom it may concern:*

Be it known that I, WILLIAM HARRIS HENDRICK, a citizen of the United States, residing at Ottawa, in the county of Franklin and State of Kansas, have invented new and useful Improvements in Shutter-Workers, of which the following is a specification.

My invention relates to improvements in shutter-workers; and it consists in certain novel features hereinafter described and claimed.

In the accompanying drawings, which fully illustrate my invention, Figure 1 is a perspective view of my improved device applied to a shutter. Fig. 2 is a horizontal section showing the shutter closed in dotted lines and opened in full lines.

Referring to the drawings by letter, A designates the window-frame, and B the shutter secured to the outer side thereof by the hinges C. The shutter is provided with the usual blind-slats, D, and in the side bar of the shutter I secure an eye, F, which is arranged between the planes of two adjacent slats.

G designates a bracket secured to the outer side of the window-frame and having a pintle, H, at its upper end. Upon this pintle H, I mount a cog-wheel, I, which meshes with a cog-wheel, J, on the outer end of a shaft, K, which extends through the window-frame into the room. A metallic plate, L, is secured to the inner side of the window-frame and is provided with an angular-opening or socket, E, through which the inner end of the shaft K projects. The inner end of the shaft K is provided with an elongated notch, M, in one side, and a tubular socket, N, having an operating-handle, O, is fitted on the end of the shaft and adapted to slide longitudinally thereon. The end of the socket N is provided with an angular portion, P, which is adapted to register with and fit into the angular opening E in the plate L, and a pin or screw, R, inserted transversely through the socket, has its inner end playing in the notch M, thereby limiting the movement of the socket on the shaft by contacting with the end walls of the notch, as will be readily understood.

The operating-handle O can be used as a curtain-holder when so desired.

Q designates a short rod having one end secured to the hub of the cog-wheel I, and thence extending through the eye F and playing loosely therein.

The operation of my device will be readily understood. When it is desired to open the shutters, the socket N is drawn out of engagement with the plate L and turned so as to rotate the shaft K. The rotation of the shaft K causes the cog-wheels I J to rotate, and the rod Q will thus be made to swing outward, and, bearing against the outer portion of the eye F, will open the shutter, as will be readily understood. The socket N is then shoved back into engagement with the angular opening in the plate L and the shutter will be locked in its position. To close the shutter, the shaft K is rotated in the contrary direction, when the free end of the rod Q will be made to bear against the rear portion of the eye F, the end bar of the shutter, and against the slats, if they are closed, and thereby push the shutter inward, thus closing the same, as will be readily understood.

It will be understood, of course, that I make no broad claim to a device for operating the shutter, as such devices have been heretofore provided. The particular features of my device which I believe to be novel are the bracket G, the rod Q, and the eye F. It will be observed that the bracket is secured vertically to the side of the building or the window-frame, and is provided at its upper end with a vertical pintle on which the gear wheel is mounted. By this construction the upper end of the bracket as a base or rest to aid the pintle in supporting the gear-wheel, so that the said wheel is effectually steadied in its movements. The rod Q, projecting from the hub of the wheel, is thus caused to act on the eye F firmly and positively. The said rod plays freely through the said eye and acts on said eye with its entire body, instead of at its outer end, and consequently is not so liable to be bent or twisted by the strain put upon it. The device is extremely simple and can be manufactured at a slight cost and quickly and easily applied to the window and the shutter.

Having thus described my invention, what I claim, and desire to secure by Letters Patent, is—

The combination of the window-frame, the shutter hinged thereto, the eye F, secured to the rail of the shutter at a suitable height and between two adjacent slats, the vertical bracket G, secured to the frame, the bevel-gear journaled on the pintle H, in a recess on said bracket, the rod Q, entering the eye F, the shaft K, the gear-wheel J on the outer end of said shaft, the handle O, the sleeve N, sliding on the squared part of the shaft K, and having the angular piston P, to enter the corresponding recess in the plate L, and the screw R, entering the recess M, all constructed and arranged substantially as and for the purpose specified.

In testimony that I claim the foregoing as my own I have hereto affixed my signature in presence of two witnesses.

WILLIAM HARRIS HENDRICK.

Witnesses:
A. W. NYE,
J. N. BELL.